March 1, 1938.  J. T. LANCASTER  2,109,570
METHOD OF AND MACHINE FOR INSERTING FASTENINGS
Filed July 18, 1935  7 Sheets-Sheet 1

INVENTOR
John T. Lancaster
By his Attorney
Victor Cobb

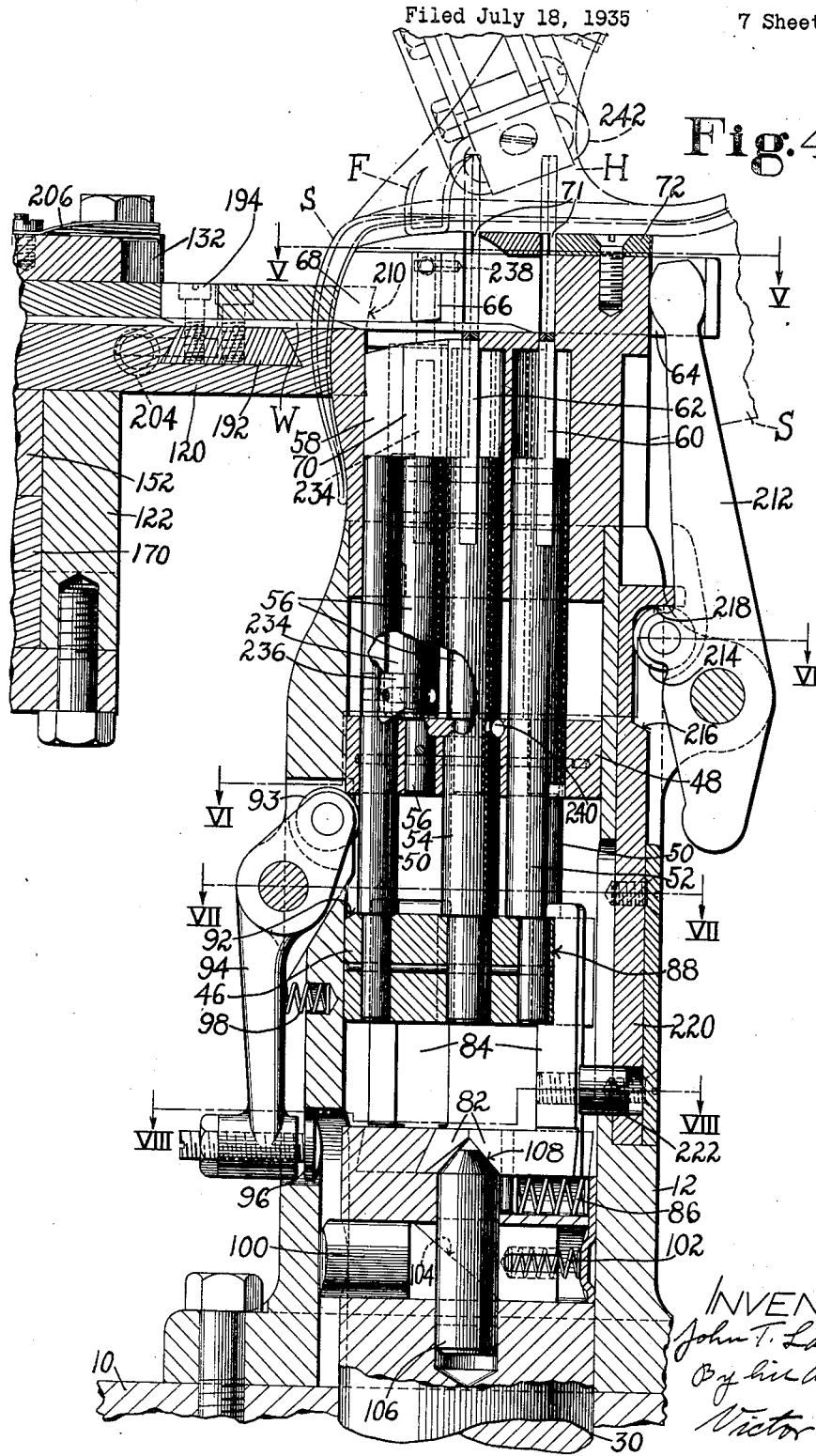

March 1, 1938.  J. T. LANCASTER  2,109,570
METHOD OF AND MACHINE FOR INSERTING FASTENINGS
Filed July 18, 1935  7 Sheets-Sheet 5
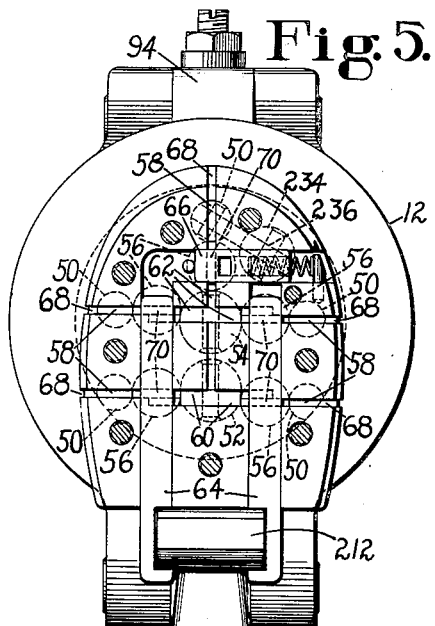
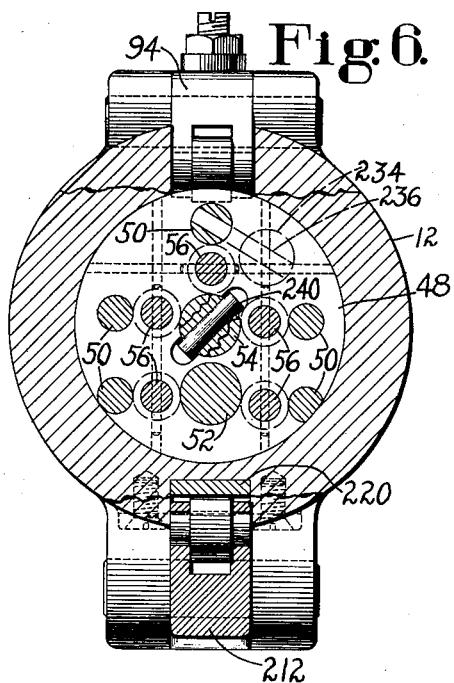
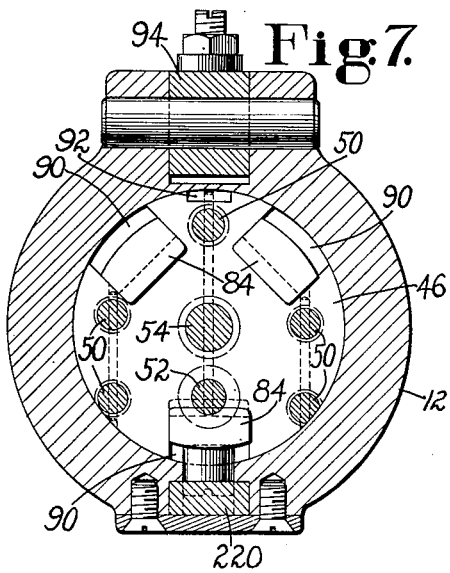
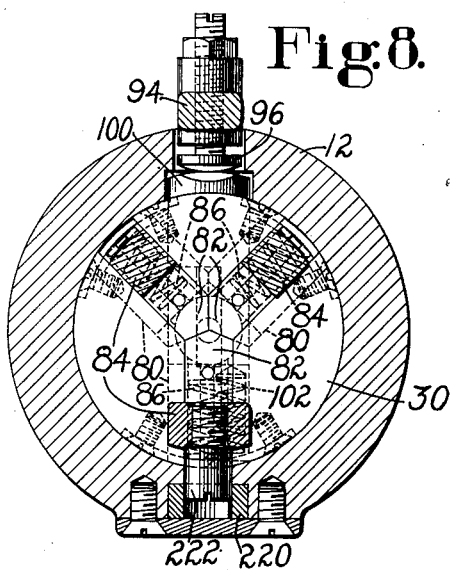
INVENTOR
John T. Lancaster
By his Attorney
Victor Cobb March 1, 1938. J. T. LANCASTER 2,109,570
METHOD OF AND MACHINE FOR INSERTING FASTENINGS
Filed July 18, 1935 7 Sheets-Sheet 6

INVENTOR
John T. Lancaster
By his attorney
Victor Cobb

March 1, 1938. J. T. LANCASTER 2,109,570
METHOD OF AND MACHINE FOR INSERTING FASTENINGS
Filed July 18, 1935 7 Sheets-Sheet 7
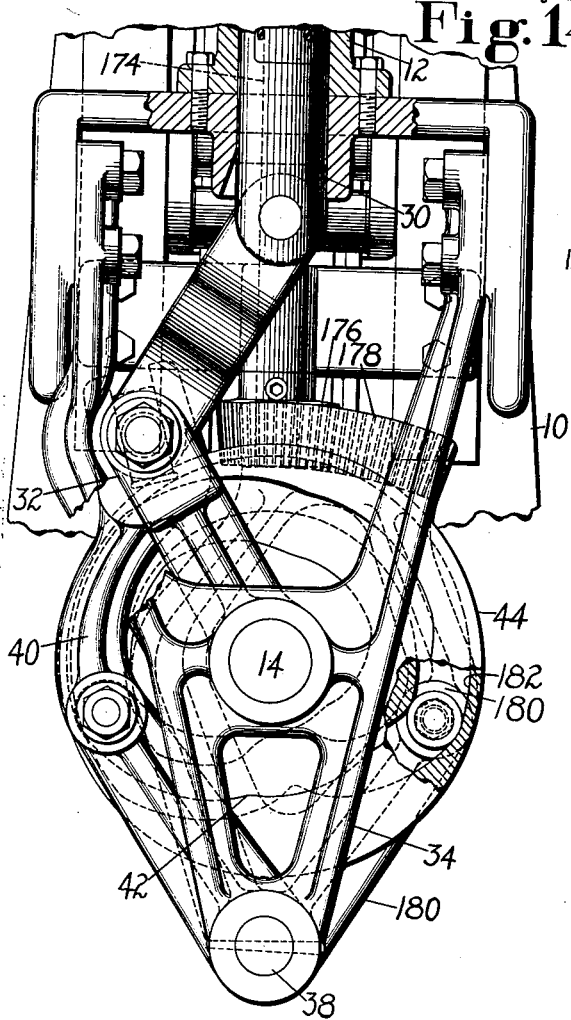
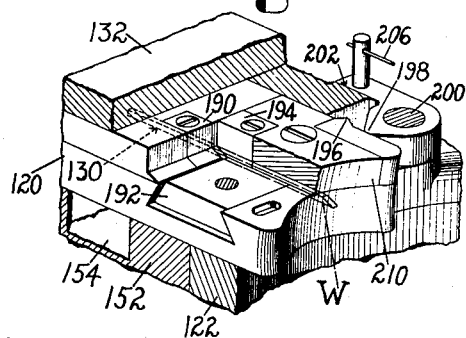
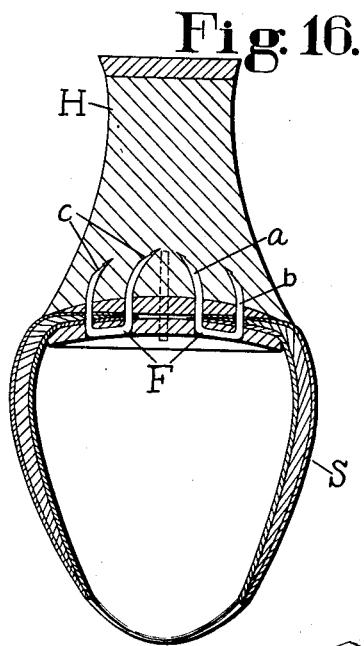
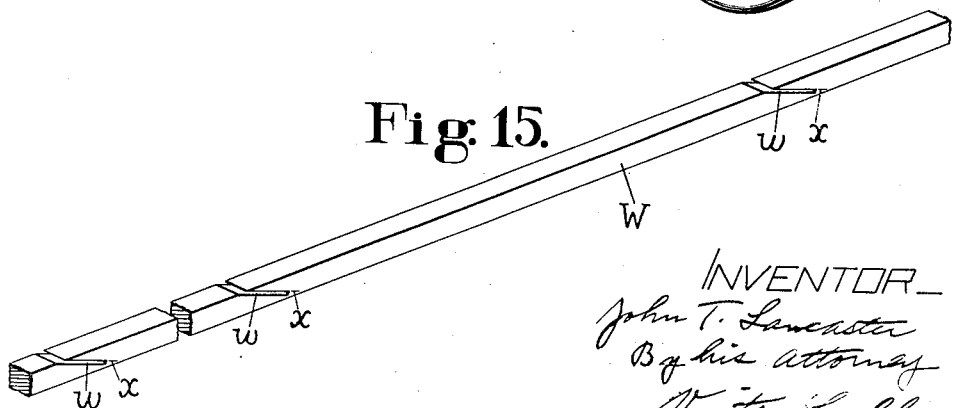

Patented Mar. 1, 1938

2,109,570

UNITED STATES PATENT OFFICE 2,109,570

METHOD OF AND MACHINE FOR INSERTING FASTENINGS

John T. Lancaster, Newtonville, Mass., assignor to United Shoe Machinery Corporation, Paterson, N. J., a corporation of New Jersey Application July 18, 1935, Serial No. 32,056

72 Claims.  (Cl. 1—32)

My invention relates to the art of inserting fastenings, possessing special utility when applied to the attachment of heels to shoes.

Fastenings, such as staples or nails by which heels are attached to shoes, are customarily taken from a mass in which there is no definite arrangement and then disposed in groups, each group predetermined as to number and properly positioned for insertion in the work. To do this with certainty is difficult, and fastenings are frequently missed and improperly arranged. For some classes of work, as women's shoes having Louis or other high, steeply inclined heels, the location of fastenings of adequate length sufficiently close to the margin of the heel-seat of the shoe to produce a tight crease, and yet not break through the wall of the heel, presents a difficult problem. The present invention has as an object the obtaining with certainty an orderly arrangement of complete loads of fastenings in inserting position, these fastenings being of such a character and so driven that proper attachment of the heels or other shoe-parts is insured.

A feature of the invention by which this object is attained lies in a method of attaching heels to shoes, in accordance with which method pieces of fastening-material, preferably taken from an elongated strand formed in a coil, are each advanced to operating position, at which it is formed into a staple or like fastening and driven into the work. Since the fastenings are produced individually from the material at and inserted from the same point, control is never lost, and the number of fastenings presented for insertion and their relation to the work may be made unvarying. In forming staples, the legs may be of unequal length, and by driving them with the shorter leg toward the outside of a heel the fastenings may be kept close to the crease, which will consequently be held against gaping. The other leg may be made considerably longer without danger of emerging through the heel-wall and will have substantial holding power. By inclining the ends of the staple-legs, the inclined surfaces being toward the outside of the heel, said legs may be deflected inwardly as they are driven, in curves which generally follow the heel-wall. This will permit reducing the spacing of the fastenings from the crease. The inclines may be formed in part by cuts made in the strand of fastening-material and spaced from one another by staple-lengths. By severing the lengths at one side of the cuts, barbed points may be produced which increase the retentive force of the fastenings.

As another feature of the invention, I provide a machine which may be used in the performance of the method just outlined. With a work-support, as the jack of a heel-attaching machine, is associated means for severing a strand of fastening-material, which may be taken from a coil, into the fastening-lengths, and delivering these lengths to the support, together with means in the support for forming the lengths into fastenings and driving said fastenings from the forming position into the work. A plurality of fastening-lengths may be delivered simultaneously, and their forming and driving effected by successive steps simultaneously for all. The fastenings are preferably in the form of staples produced by bending the severed lengths of material. Regardless of how the fastening-lengths are delivered, there is believed to be patentable novelty in the combination of members movable in the jack of a heel-attaching machine for successively forming and inserting staples or other fastenings. The fastening-material, preferably wire, may be delivered from coils into passages in the jack where the forming and driving instrumentalities act upon them. The bending of the staples is herein disclosed as performed over one or more anvils movable between an active forming position and an idle position, at which active position drivers insert the staples. In the jack or other work-support I may provide a plunger or actuating member upon which one or more connecting members are movable, these connecting members first producing travel of the fastening-forming elements and thereafter of the fastening-driving elements. The connecting means, or an element movable thereby, controls the positions occupied by the anvils. To cause delivery of the fastening-material to the jack or work-support, the coil or coils of such material are mounted upon slides or carriers, together with feeding mechanism and cutting mechanism for the material. Novel driving mechanism is provided for operating the carrier or carriers, with their associated mechanisms, and the actuating member in the support. Since the completed work must be removed promptly from the support to permit the delivery thereto of the fastening-material, a pressure member, which holds the work in place for the operation upon it, is arranged to grasp said work and lift it, leaving the receiving passages free for the entrance of the fastening-material. The grasping means is latched in engagement with the work, to be released by the operator at his convenience. In a heel-attaching machine, the heel to be secured In the accompanying drawings, Fig. 1 is a top plan view of a particular embodiment of the invention, the upper portion being omitted;

Fig. 2 is a side elevation, parts being broken away and in section;

Fig. 3, an enlarged, broken, front elevation of the jack and portions of the wire-delivering mechanisms;

Fig. 4, a central, vertical section through the jack;

Figs. 5, 6, 7 and 8, four horizontal sections on the lines V—V, VI—VI, VII—VII and VIII—VIII, respectively, of Fig. 4;

Figs. 9 and 10, enlarged sectional details upon the lines IX—IX and X—X, respectively, of Fig. 1;

Fig. 13 is a detail in perspective of the wire-cutting mechanism;

Figure 1:
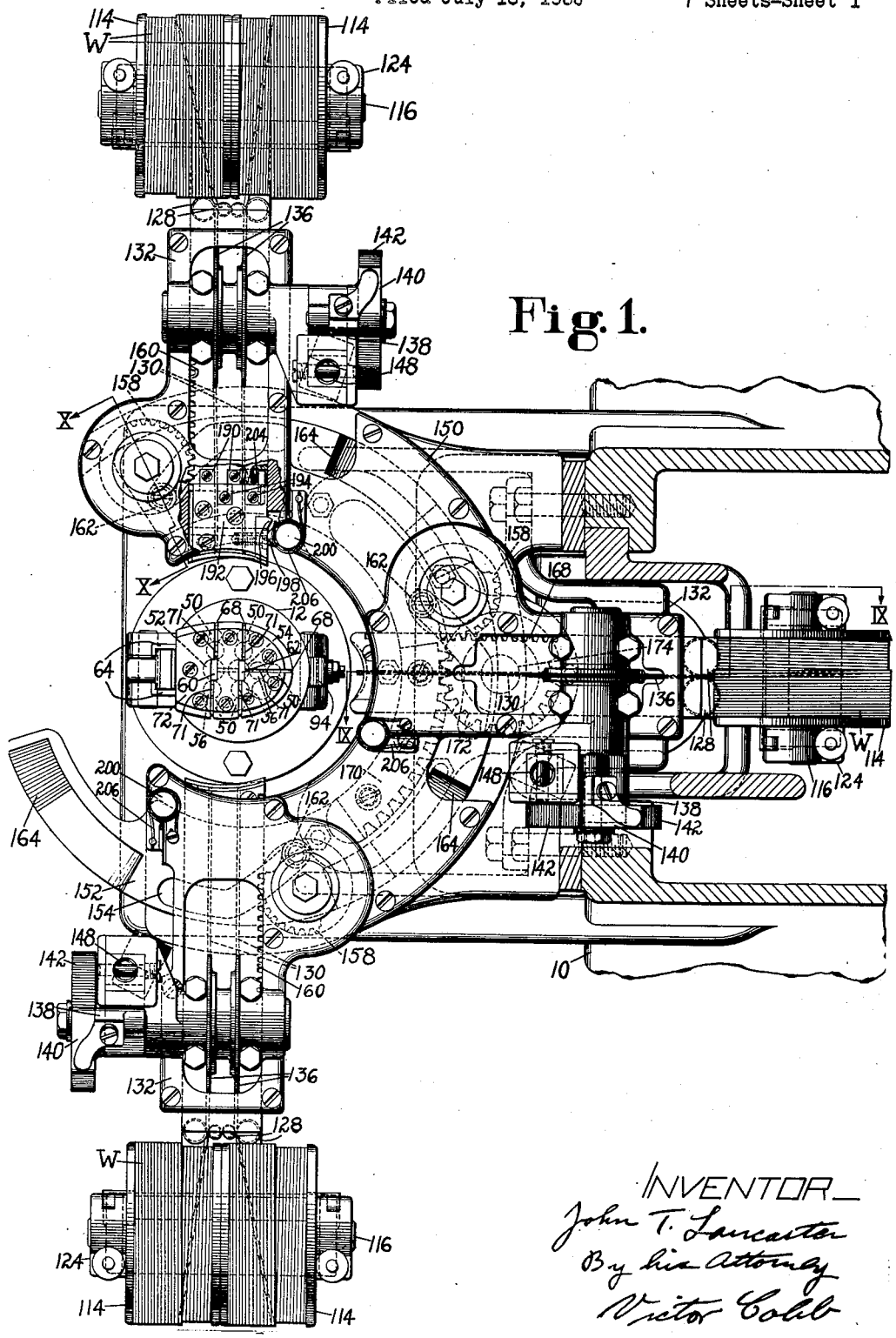

Fig. 14, a detail in front elevation of the driving mechanism of the machine;

Fig. 15, an enlarged perspective view of a section of the wire from which the fastenings are made, and Fig. 16, a transverse section through a shoe with its heel attached by my improved machine.

I have chosen to illustrate my invention in connection with a machine for attaching heels by fastenings driven from within shoes, which is the subject of Letters Patent of the United States No. 2,040,885, Standish, May 19, 1936. At the front of a frame 10 is mounted a work-supporting jack 12 containing fastening-inserting mechanism peculiar to the present invention and operated from a main shaft 14 (Fig. 2), as will be later described. Above the jack a pressure-head 16 slides vertically upon the frame, it carrying heel-abutment members which furnish a feature of the invention, as will hereinafter be pointed out. The pressure-head is held normally raised by a spring 18, and is moved down by a treadle 20 and connecting rod 22 to cause its abutment members to bear upon a heel placed upon the heel-seat of a jacked shoe. After the establishment of this preliminary or measuring pressure upon the work, and upon continued depression of the treadle, a clutch 24 is tripped to cause cam mechanism 26 to apply power from the shaft 14 to the head through a hydraulic connecting device 28. This places the work under final or clamping pressure in preparation for the insertion of the fastenings. Since such application of preliminary and final pressure is the customary procedure in apparatus of this class, and as the mechanism 28 is merely a convenient connecting means and not essential to my invention, no detailed description is thought necessary.

Considering the fastening-forming and -inserting mechanism, the jack 12 has mounted for vertical reciprocation in it an actuating plunger 30. To impart power to this plunger, there is articulated to it the upper extremity of a toggle-lever 32 (Fig. 14), the lower end of which is pivoted upon the shaft 14, which has adjacent to the lever a bearing in a bracket 34 depending from the frame beneath the jack. Secured in the lower portion of the bracket 34 and in an inner bracket 36 is a spindle 38 about which a lever 40 may oscillate. The upper extremity of the lever is joined to the center of the toggle 32, and, below this, said lever carries a roll operating in a cam-path 42 in the outer face of a disk 44 fast upon the shaft 14. Within the jack, above the top of the plunger 30, is a former-plate 46 (Fig. 4) and, above this, a driver-plate 48, both guided in the cylindrical jack-interior. Assuming that five staples are to be made and driven, there rises from the plate 46 five outer rods 50, an inner front rod 52 and an inner rear rod 54, while the plate 48 is provided with five driver-rods 56. Each rod 50 has secured to its upper end a staple-forming bar 58 (Fig. 5). The rod 52 carries two of these bars 60, 60, which may be portions of an integral member, co-operating with the corresponding forward outer bars 58. The rod 54 has three former-bars or bar-portions 62 for co-operation with the three rear outer formers. Each co-operating pair of formers 58, 60 and 58, 62 at the sides of the jack are slightly staggered from front to rear to permit the adjacent inner formers to operate side by side. Between the pairs of side formers 58, 60 and 58, 62, anvils 64, 64 reciprocate horizontally from front to rear of the jack-top, and about these anvils staple-material is bent by the formers. Another anvil 66, reciprocating transversely of the jack-top, co-operates with the rear formers 58 and 62 in a similar manner. Wires, or strands of other staple-material, are supplied below the anvils and above the formers through slots or passages 68 in the jack to be formed into staples. Each driver-rod 50 has rising from its upper extremity a driver-bar 70, which may be moved in the reciprocation of the plate 48 into the spaces between the corresponding pairs of former-bars to insert through an opening or passage 71 in the top-plate 72 of the jack the staple which has been formed. There will now be described the mechanisms for actuating the formers, anvils and drivers, and for delivering the staple-wire and clamping the work.

In radial ways 80 in the top of the plunger 30, three carrier-slides 82 are guided for horizontal reciprocation (Figs. 4 and 8). Rising from the outer portion of each slide is a connecting projection 84, through which movement is communicated successively from the plunger to the former-assembly and to the driver-assembly. Initially, when upward travel of the plunger begins, each projecting member 84 will be urged by a spring 86 acting upon its slide so that the wall of a depression 88 in the upper portion of the member will embrace the former-plate 46 to compel it to travel with the plunger. This engagement of the members with the plate is at the inner walls of recesses 90 (Fig. 7) in the edge of said plate. Consequently, as the plunger is elevated by the cam 42, the formers 58, 60 and 62 will be carried up to bend the wire about the anvils 64 and 66 to produce staples F. This is without immediate effect upon the driver-assembly, the plate 48 of which is spaced from the upper ends of the projections 84. When the thus-produced former-travel has progressed to a point at which the legs of the staples will have been bent substantially parallel to the sides of the anvils, an inclined surface 92 upon the upper edge of the plate 46 will strike a roll 93 upon the upper extremity of a lever 94 fulcrumed upon the jack 12, and carrying at its lower end an adjustable contact-piece 96, which is held normally out by a spring 98 acting upon the lever. This engagement of the surface 92 with the roll swings the contact-piece in through an opening in the jack. At the time this lever-actuation occurs, a slide 100 movable horizontally in and transversely of the plunger 30 will be opposite the contact-piece and will be forced in thereby against a spring 102. Upon the slide is a cam-incline 104 bearing against a complemental incline upon an actuating slide 106, movable vertically along the axis of the plunger and provided with an inclined cam-end 108 acting upon all the horizontal carrier-slides 82 to force them outwardly. The projections 84 are thus carried away from the plate 46 in the recesses 90 until said plate is released from the depressions 88, and the plunger, with the slides and projections, continues its upward travel to perform the inserting operation, which will shortly be described.

Figure 2:
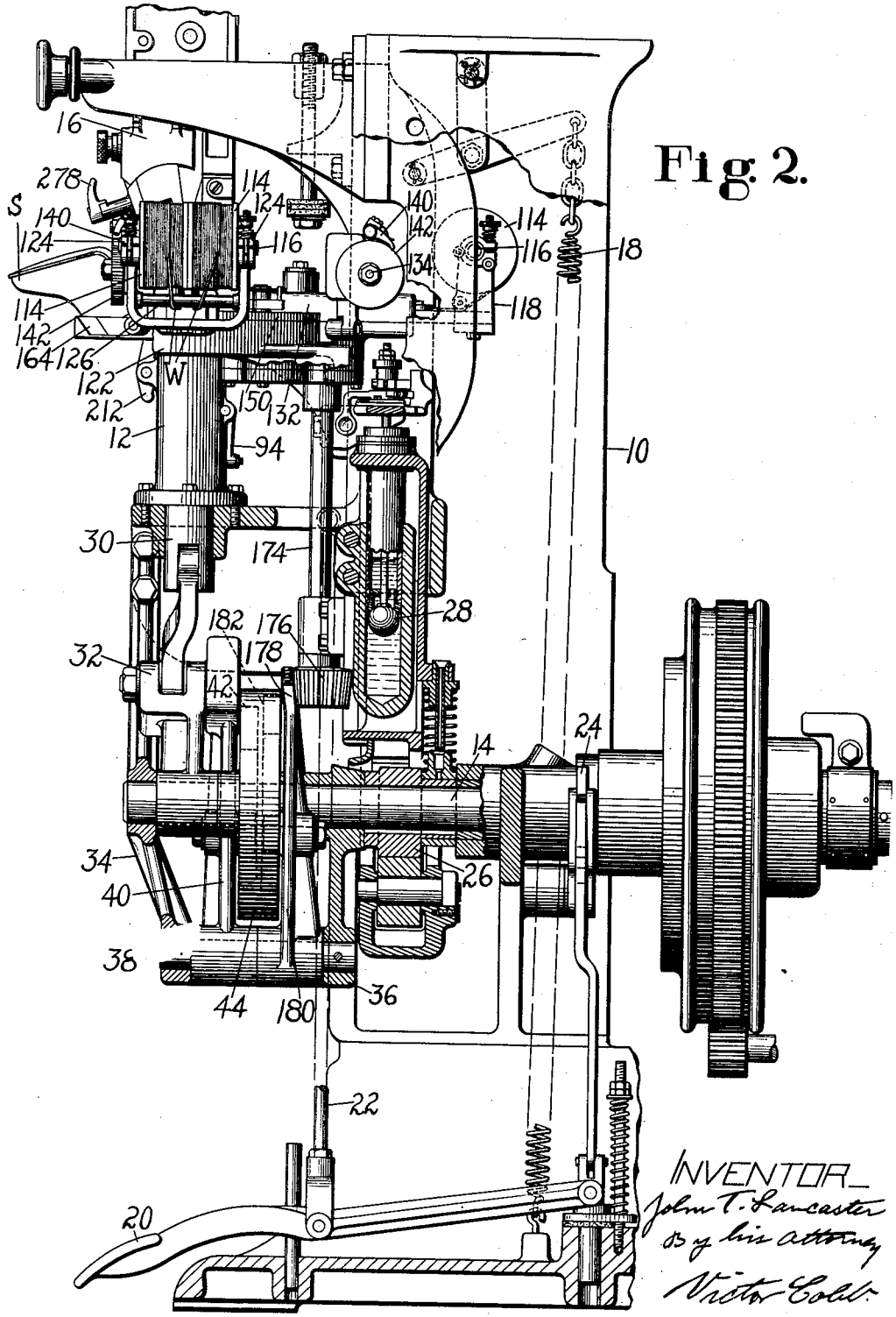
Figure 9:
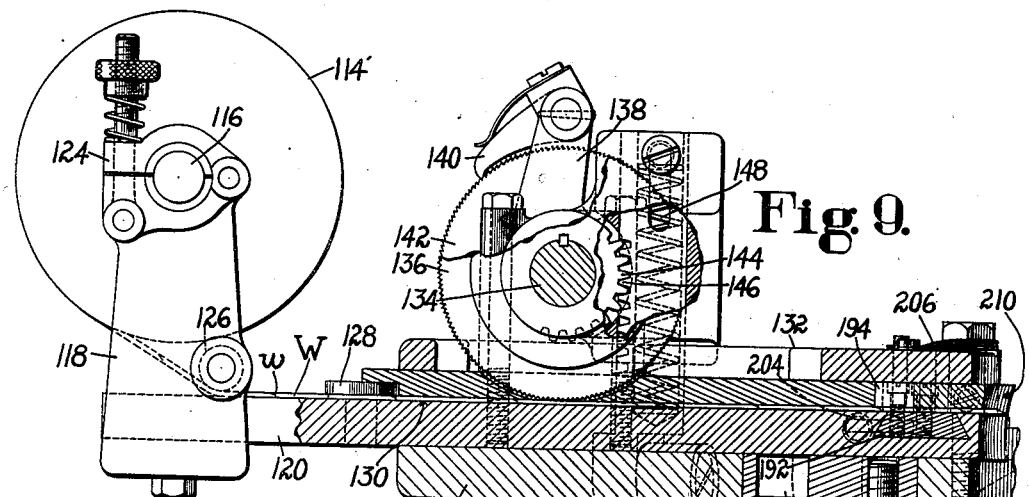

While the formers 58, 60 and 62 were being operated as above outlined, the anvils 64 and 66 were occupying their active positions, as illustrated in Fig. 5, five sections of staple-wire having been delivered beneath them ready to receive the action of the formers. I prefer to employ wire of angular cross-section, as shown at W in Fig. 15, much enlarged, and to have such wire partially severed at the staple-lengths by inclined slots $w$. By cutting the wire in the machine, when making the staples, at the outer sides of the bottoms of the slots, as indicated by the light lines at $x$ in Fig. 15, barbs are formed, which increase the holding power of said staples. Figs. 1, 2 and 9 show the wire W wound upon reels 114 rotatable about spindles 116 secured horizontally in standards 118, rising from the outer ends of carrier-slides 120 movable upon a horizontal frame-extension 122. There are three slides 120, those at opposite sides of the jack carrying two reels delivering to the side jack-passages 68, while the rear slide has a single reel delivering to the rear passage in the jack. Brake mechanism 124 acts upon the hub of each reel to prevent it from spinning. From its reel, each wire W is led beneath a guide-roll 126 and then between side retaining rolls 128 into a groove 130 in the corresponding slide 120 beneath a cover-plate 132. Journaled across each slide is a shaft 134 carrying at the respective sides of the jack two feed-wheels 136 and, at the rear, one of these wheels. Each wheel has a toothed periphery passing through a slot in its cover-plate and engaging the corresponding wire to press it into the groove 130. Each shaft 134 has arranged to oscillate about it an arm 138, upon the end of which is pivoted a pawl 140 engaging a ratchet-wheel 142 fast upon the shaft. Secured to the arm is a segmental pinion 144 with which meshes a rack 146 guided for vertical movement in an extension from one of the shaft-bearings. A spring 148 urges each rack normally down. The racks 146 are reciprocated to unreel and advance the wire, and the slides 120 are reciprocated to properly present said wire to the jack-passages 68 by the following mechanism.

Figure 10:
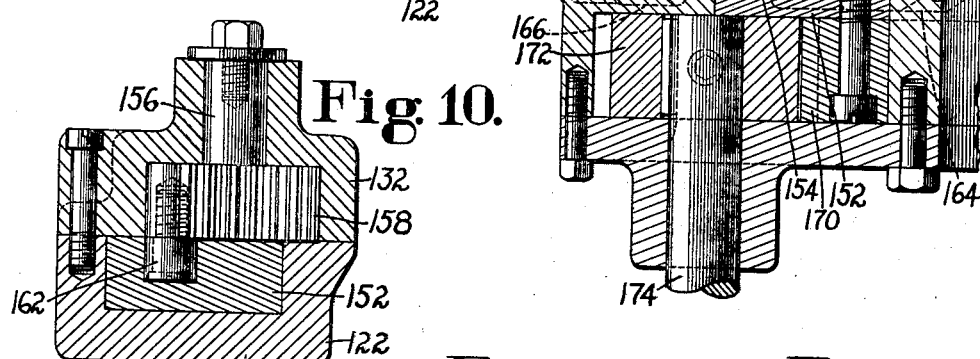

Guided in the frame-extension 122 beneath a cover-plate 150 is a segmental actuating plate 152, and in this plate there is a cam-slot 154 for each slide 120 and its associated elements. In the cover-plate 132 adjacent to each slide is journaled a vertical shaft 156 (Fig. 10), having fixed upon it a segmental pinion 158 meshing with a rack 160 upon one edge of the corresponding slide. Depending from the pinion into the cam-slot is a projection 162. The oscillation of the pinion produced by the cam-slot reciprocates the slide to cause its inner end to approach or recede from the jack. Associated with each slide 120 on the actuating plate 152 is a cam-surface 164, which, in the inward position of its slide, will act upon a roll 166 (Fig. 9) rotatable upon the lower extremity of the corresponding rack 146. This cam-surface, with the spring 148, oscillates the pawl 140 to intermittently rotate either one or two of the feed-wheels 136, depending upon which slide is being considered. To render the cams 154 and 164 effective, the plate 152 is continuously oscillated during the operation of the machine. For this purpose, said plate carries upon its periphery a gear-segment 170, having meshing with it a pinion 172 (Fig. 1) secured to the top of a vertical shaft 174 (Figs. 2 and 14) journaled within the frame at the rear of the jack. Fast upon the lower end of the shaft is a bevel-pinion 176 rotated by a bevel-segment 178 formed upon the upper portion of an arm 180 arranged to oscillate about the spindle 38 at the rear of the cam-disk 44. A cam-path 182 in the inner face of the disk 44 imparts to the arm 180, and therefore to the plate 152, the desired motion.

When the staple-wires have been delivered to the jack-passages 68 by the combined movement of the carrier-slides 120 and the feed-wheels 136, they are to be severed into staple-lengths at the cuts $w$ prior to their bending by the formers 58, 60 and 62. As seen in Figs. 1, 9 and 13, each carrier-slide 120 has fixed at its inner extremity either one cutter-block 190 for the rear slide or two for the others. Movable in ways transversely of each carrier-slide is a cutter-slide 192, provided with one or more cutter-blocks 194 situated in shearing relation to the blocks 190 and at the opposite sides therefrom of the grooves 130 in which the wires W rest. Just as the inward movement of each slide 120 begins, a projection 196 upon the cutter-slide 192 strikes an actuating finger 198, which is arranged to oscillate about a stud 200 upon the carrier-slide but, at the time of this contact, is held against turning by engagement of a tail-portion with a wall upon the carrier-slide at 202. This contact between the projection and finger causes the cutter-slide to be shifted across the carrier-slide and its block or blocks 194 to co-operate with the corresponding blocks 190 to sever the wires. Each slide 192 is returned to its normal position by a spring 204. During this reverse movement of the slide-projections 196, the fingers 198 are turned about their studs against the force of springs 206, which, after the projections have passed, return the fingers to their initial positions.

Figure 3:
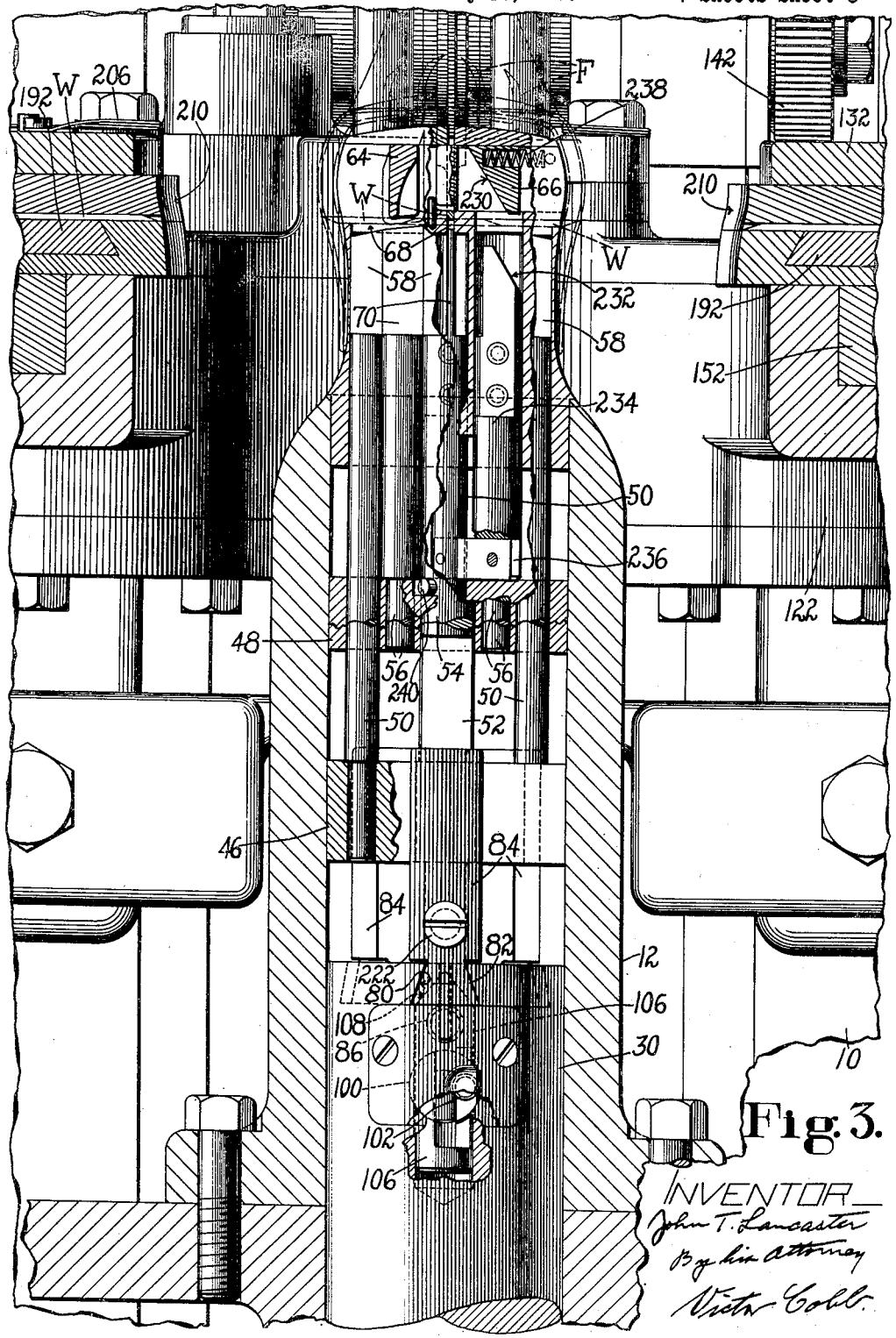

Considering the feeding action upon the wires W, the beginning of an operating cycle finds their ends situated at different distances from the inner extremities of the grooves 130 in the slides 120, this relation depending upon the spacing of the completed staples from the periphery of the heel being attached. The rear wire, as appears in Figs. 4 and 9, will have been fed forward after it has been cut and while its slide is being advanced, until the end of the succeeding staple-piece is within the jack-passage 68. The side pieces, as shown in Fig. 3, are fed a less distance after they are severed, their ends remaining within the slide-grooves 130. In the ends of each wire, a barb has been formed at $x$ when the cutting mechanism acted. The cam-groove 182, through the shaft 174 and its gearing, imparts to the plate 152 a feed-producing oscillation. Through the cam-slots 154 and the gearing 158, 160, the carrier-slides 120 are reciprocated, their inner ends 210 being brought into close proximity to the side wall of the jack, to which they preferably conform. At the termination of the advance of the carrier-slides, the cams 164 actuate the feed-wheels 136 through the gearing 144, 146 and the ratchet mechanism 140, 142. This continues until a staple-length has been drawn from each reel 114, the engagement of its forward extremity advancing the previously severed piece into forming position in the jack over one of the anvils 64 or 66. The pressure of the toothed feed-wheels 136 upon the wire may be sufficient to produce therein a series of indentations, which add their holding effect to that of the barbs. The feeding cycle closes with a return of the elements to their normal relation. The action of the feed-wheels 136 is preferably such that the inner end of each piece is advanced to a greater distance past its anvil than remains at the outer end outside the anvil. As a consequence of this, there will be formed a fastening provided with an inner leg $a$ (Fig. 16) which is longer than its outer leg $b$, and the direction of the cut $w$ is such that each leg has an inclined end $c$ turned toward the outside of the jack. The effect of this arrangement, when the staple is driven, will be indicated in connection with the closing statement of operation.

There has already been described the action of the formers 58, 60 and 62 with their anvils upon the pieces of wire W to give the staples F, and reference has been made to the drivers 70 reciprocated by the rods 56 and the plate 48. Before these drivers act, the anvils must be withdrawn from their forming positions. This is accomplished for the side anvils 64, 64 by a lever 212 (Fig. 4), fulcrumed upon the front of the jack and entering opposed depressions in said anvils. The lever carries a roll 214, which may be engaged at its opposite sides by an inclined cam-surface 216 and by an overhanging surface 218 upon an actuating slide 220, said slide being movable vertically upon the jack. Into an opening in the slide extends a pin 222 carried by one of the connecting projections 84. When this projection has risen to a point at which the former-operation is completed, the surface 216 will have reached the roll 214 to swing the upper end of the lever 212 outwardly, carrying the anvils 64, 64 out of the path of the drivers 70. Upon the return of the projection 84 to its lowered position, the slide-surface 218 strikes the roll 214, restoring the anvils to their forming position. The rear anvil 66 (Fig. 3) has at its inner side an inclined surface 230. At the completion of the operation of the formers, there comes into engagement with this surface a complementally inclined surface 232 upon a retracting member 234 rising from a bracket 236 extending from the rear former-rod 50. The anvil is thereby forced out of the path of the corresponding driver, being returned to its operating position by a spring 238.

With the paths thus cleared, and with the yokes of the formed staples resting upon the drivers, said staples may be inserted in the work in the following manner. After the connecting members 84 release the former-assembly from the upwardly traveling plunger 30, their upper ends come into contact with the under side of the driver-plate 48. This elevates the driver-assembly, and the drivers 70, bearing upon their upper ends the staples F which have just been formed, force these through the openings in the top-plate 72 of the jack, through the heel-seat of a shoe S supported thereon and into a heel H, which has been applied to the heel-seat and clamped in place by the pressure-head 16. The drivers having risen until the staple-yokes are sunk in the heel-seat-material, the travel of the plunger is reversed by the cam 42. The members 84 descend, leaving the driver-plate 48, but the return movement of the driver-assembly is insured by contact of a projection 240 upon one of the side former-rods 50 with the upper surface of said plate upon the lowering of the former-assembly. When the depressions 88 in the connecting members register with the edge of the former-plate 46, the springs 86 cause these elements to be coupled so the former-assembly is returned to normal.

Figure 11:
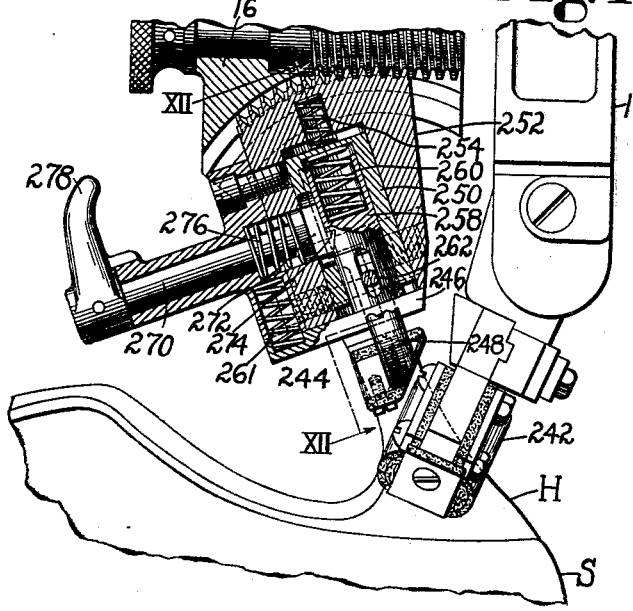
Fig. 11 is a broken detail in side elevation of the pressure-abutments for the heels to be attached.
Figure 12:
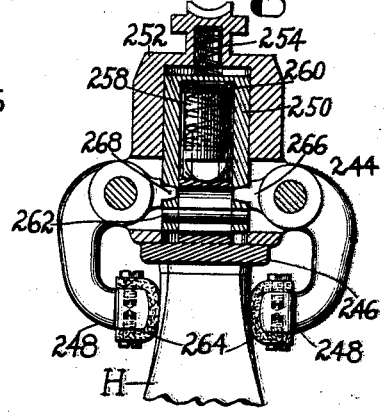
Fig. 12 is a transverse section on the line XII—XII of Fig. 11.

Because the delivery of the staple-wire to the jack occurs during the final period of an operating cycle, the heeled shoe must be promptly removed from the jack, and I prefer to effect this under the power of the machine. The pressure-head 16 carries two pressure-abutments. The rear fork 242 may be of conventional form. The tread-abutment 244 (Figs. 11 and 12) has a tread-engaging-plate 246 and opposite side clamping members 248, 248. Guided for vertical movement in a supporting casing 252 furnishing a portion of the tread-abutment, and urged downwardly by a spring 254, is a sleeve 250. The sleeve has movable within it a plunger 258 carrying the tread-plate 246, and forced down by a spring 260 seated in a bore in the plunger and contacting with the top of the sleeve and a spring 261 interposed between the tread-plate and the casing. The movement is to the extent permitted by a retaining pin 262 bridged between the sides of the sleeve and passing through a slot in the plunger. The side members 248 are shown as levers, fulcrumed upon the casing 252 and provided with heel-engaging pads faced at 264 with some such material as rubber. Arms 266 upon the levers extend through slots in the casing and at the inner ends have reduced portions 268 fitting within openings in the sleeve 250. When the abutments are lowered by the head 16 into engagement with a heel H, the plate 246 strikes the tread-surface of said heel and yields against the spring 260. This movement of the tread-plate and plunger is transmitted through the spring 260 to the sleeve 250, which, in turn, acts through the projections 268 upon the levers 248 to force the yieldable pads 264 against the sides of the heel. A contact at this time of the plate 246 with the lower face of the casing furnishes a rigid tread-abutment. The levers 248 are temporarily secured in their clamping relation by a latch member 270 movable in the casing 252 and provided with a head 272, passing through a slot in the sleeve 250 and having a detent 274 for engagement with a depression in the adjacent side of the plunger. A spring 276 urges the member 270 into its latching relation, and it may be drawn out by the operator to free the work by a handle 278, the spring 254 then returning the clamping levers 248 to their normal positions. The passage of the latch-head 272 through the sleeve limits the extent to which this may be moved down by the spring 254. When the pads 264 upon the levers 248 engage the heel, they first center it laterally and then grasp it, being secured in this relation by the latch before the plate 246 reaches its final tread-clamping position against the end of the casing. When the operating cycle is completed, and the head 16 is lifted by its spring 18, the work is at once removed from the jack by said grasping levers 248, leaving the passages 68 free to receive the staple-wires.

The operating sequence of the apparatus may be as follows: The operator places a shoe S to be heeled upon the jack 12, and applies to its heel-seat a heel H. The treadle 20 is depressed, lowering the head 16 so the rear fork 242 and the tread-plate 246 engage the heel. The yield of the plate causes the levers 248 to center and grasp the heel, they being retained in clamping engagement by the latch 270. Continued depression of the treadle trips the clutch 24 to initiate a single operating cycle of the machine. Through the cam 42 the plunger 30 is elevated in the jack. Since the former-plate 46 is coupled to the plunger by the connecting members 84, it also rises. The previous cycle left cut lengths of wire W in the jack-passages 68 ready for bending to staple-form, and the anvils 64 and 66 are in place above these pieces of wire. The ascent of the former-plate 46 and its rods 50 carry the pairs of formers 58, 60 and 62 up the opposite sides of the anvils, bending the wire pieces over these to produce the staples. This having been accomplished, the lever 94, actuated by contact of the plate 46, disengages the connecting members from the former-plate. So the former-assembly remains at rest while the rise of the plunger continues, to bring the ends of the members 84 against the driver-plate 48 to elevate this and its drivers 70. First, however, the action of the slide 220, moving with the connecting members, and the retracting member 234, carried by one of the former-rods 50, will have withdrawn the anvils. The staples F are therefore free for their insertion. When the upper ends of the rising members 84 reach the under side of the driver-plate 48, they force it up with the drivers 70 carrying the staples upon them, and these are inserted through the jack-top-passages 71 into the heel-seat of the jacked shoe and the heel, the attachment of which is thus completed. The cam mechanism 26 thereupon releases the pressure-head 16, which is elevated by its spring 18. Since the attached heel is grasped by the abutment-levers 248, the work is at once removed from the jack and may be taken by the operator by releasing the latch 270. Upon the completion of the staple-inserting operation, the descent of the plunger 30 begins, and when the depressions 88 in the connecting members 84 reach the former-plate 46, they are forced into engagement with it by the springs 86. This causes the former-assembly to descend. When the former-projection 240 contacts with the top of the driver-plate 48, this is positively lowered. The surface 218 of the slide 220, traveling with the contact members, engages the roll 214 and causes the lever 212 to carry the side anvils 62 into operating position, while the spring 238 similarly affects the rear anvil 66. All the forming and driving elements are thus restored to the positions which they occupied at the beginning of the cycle. During the termination of the forming operation, the advance of the carrier-slides 120 toward the jack begins, and the correctly projected staple-lengths which they carry are at once severed at the slots w by the cutters 190 and 194. Upon the removal of the heeled shoe by the tread-abutment 244, the inner ends of the slides 120 will have reached the jack, and, while they are resting in substantial contact therewith, the rotation of the feed-wheels 136 uncoils the succeeding staple-lengths, these forcing the previously cut pieces into the jack-passages 68. The elements of the wire-feeding mechanism return to their initial positions, leaving the pieces in the jack-passages lying across the anvils ready for the next operation. This completes the cycle.

Referring to Fig. 16 of the drawings, there is illustrated a shoe S to which a heel H has been attached by staples F, formed and driven by the present machine. Since each staple has its longer leg $a$ considerably spaced from the periphery of the heel, there is no danger of its emergence through the side-wall. Its length may therefore be such as to give a great retentive effect. As the outer leg $b$ is relatively short, the staples may be driven in such proximity to the outside of the heel that a close crease is insured without breaking through the wall. When the ends $c$ of the staple-legs penetrate the material into which they are driven, the direction of the inclined surfaces causes the resisting force to have a component which deflects the legs inwardly in curves generally following the vertical curvatures of the heel-wall. This both keeps the points of the legs from puncturing said wall and also increases the resistance of the fastening to withdrawal, as do the barbs $x$ (Fig. 15) and the indentations produced by the feed-wheels 136. The yokes of the staples are effective in preventing the fastenings from pulling through the heel-seat-material. Generally, it may be said that a heel-attachment of great security is attained, with a tight crease and entire freedom from mutilation of the outer wall of the heel. In the machine of this invention, by which fastenings are formed at the points at which they are to be driven, there are eliminated the many troubles which arise from separating fastenings, especially staples, from others carried by a supply-receptacle in a disorderly mass, arranging them in loads each containing a definite number and delivering these loads in predetermined relations to the jack of a heeling machine.

Having described my invention, what I claim as new and desire to secure by Letters Patent of the United States is:

1. The method of attaching heels to shoes which consists in severing a piece of fastening-material from a strand thereof and delivering it at an operating position, forming the positioned piece into a fastening, applying a heel to the heel-seat of a shoe, and driving the fastening from the forming position into the shoe and heel.

2. The method of attaching heels to shoes which consists in severing a plurality of pieces of fastening-material from strands thereof and advancing them through different distances to positions for operations upon them, forming the positioned pieces into fastenings, applying a heel to the heel-seat of a shoe, and driving the fastenings simultaneously from their forming positions into the shoe and heel.

3. The method of attaching heels to shoes which consists in delivering a piece of staple-material into operating position, forming the positioned piece into a staple, applying a heel to the heel-seat of a shoe, and driving the staple from its forming position into the shoe and heel.

4. The method of attaching heels to shoes which consists in delivering a piece of staple-material into operating position, forming the positioned piece into a staple having legs of unequal length, applying a heel to the heel-seat of a shoe, and driving the staple into the shoe and heel with its shorter leg nearer the periphery of the heel than the longer leg.

5. The method of attaching heels to shoes which consists in cutting a piece of staple-material from a strand thereof, the plane of the cut being inclined to the length of the piece, delivering the piece of cut material into operating position, forming said piece into a staple with the inclined ends at the same side, applying a heel to the heel-seat of a shoe, and driving the staple into the shoe and heel with the inclined surfaces of the legs turned toward the periphery of the heel.

6. The method of attaching heels to shoes which consists in cutting a piece of staple-material from a strand thereof, the plane of the cut being inclined to the length of the piece, delivering the piece of cut material into operating position, forming said piece into a staple having legs of unequal length with the inclined ends at the same side, applying a heel to the heel-seat of a shoe, and driving the staple from its forming position into the shoe and heel with its shorter leg nearer the periphery of the heel than the longer leg and with the inclined surfaces of the legs turned toward the periphery of the heel.

7. The method of attaching heels to shoes which consists in cutting pieces of staple-material from a strand thereof in which are spaced slots inclined to the length of the strand, the staple-pieces being severed at the slots, delivering each severed piece into operating position, forming the thus-positioned piece into a staple having at the ends of its legs inclines furnished by walls of the slot, applying a heel to the heel-seat of a shoe, and driving the staple into the shoe and heel with the inclined surfaces of the legs turned toward the periphery of the heel.

8. The method of attaching heels to shoes which consists in cutting pieces of staple-material from a strand thereof in which are spaced slots inclined to the length of the strand, the staple-pieces being severed at one side of the slots to form barbed points at the ends of the slots, delivering each severed piece into operating position, forming the positioned piece into a staple having at the ends of its legs inclines furnished by walls of the slot, applying a heel to the heel-seat of a shoe, and driving the staple into the shoe and heel with the inclined surfaces of the legs turned toward the periphery of the heel.

9. The combination with a work-support, of means for severing a strand of fastening-material into fastening-lengths and delivering such severed lengths to the support, means operating in the support for forming the lengths into fastenings, and means for driving the fastenings from the forming position into the work.

10. The combination with a work-support, of means for holding a coil of fastening-material, means for uncoiling the material, severing it into fastening-lengths and delivering such severed lengths to the support, means for operating in the support for forming the lengths into fastenings, and means for driving the fastenings from forming position into the work.

11. The combination with a work-support provided with passages for receiving fastening-material and passages through which fastenings are inserted, of mechanisms situated about the support for delivering fastening-material, plural means associated with the delivering mechanisms for severing the material into fastening-lengths and delivering such severed lengths to the receiving passages, fastening-forming members movable in the support, and members movable in said support for driving the fastenings through the inserting passages.

12. The combination with a work-support provided with passages for receiving fastening-material and passages through which fastenings are inserted, of mechanisms situated about the support for delivering fastening-material to the receiving passages, the mechanisms being arranged to deliver the material through different distances to different receiving passages, fastening-forming members movable in the support, and members movable in said support for driving the fastenings through the inserting passages.

13. The combination with a work-support provided with passages for receiving fastening-material and passages through which fastenings are inserted, of mechanisms situated about the support for delivering fastening-material to the receiving passages, the mechanisms being arranged to deliver the material through different distances to different receiving passages, fastening-forming members movable in the support, members movable in said support for driving the fastenings through the inserting passages, and means arranged to sever the material prior to the completion of its delivery.

14. In a heel-attaching machine, a jack, movable fastening-forming members and movable fastening-inserting members mounted within the jack, and means for moving said members successively.

15. In a heel-attaching machine, a jack, movable fastening-forming members and movable fastening-inserting members mounted within the jack, means for moving said members successively, holders for coils of fastening-material, and means for uncoiling the material from the holders and delivering it within the jack to the forming members.

16. In a heel-attaching machine, a jack, movable fastening-forming members and movable fastening-inserting members mounted within the jack, means for moving said members successively, holders for coils of fastening-material, means for cutting fastening-pieces from the coil, and means for uncoiling the material from the holders and delivering the cut pieces within the jack to the forming members.

17. In a heel-attaching machine, a jack, staple-bending members and staple-driving members movable in the jack, and means for moving said members successively.

18. In a heel-attaching machine, a jack, staple-bending members and staple-driving members movable in the jack, means for moving said members successively, and means for delivering staple-wire through different distances to different bending members.

19. In a heel-attaching machine, a jack having wire-receiving passages in its side wall and fastening-inserting passages in its top, means for feeding wires into the receiving passages, fastening-formers acting upon the wires within the jack, and drivers movable in the jack to force the formed fastenings through the inserting passages into the work.

20. In a heel-attaching machine, a jack having wire-receiving passages in its side wall and fastening-inserting passages in its top, holders for coils of wire, feeding mechanism for uncoiling the wires from the holders and introducing it into the receiving passages, fastening-formers acting upon the wires within the jack, and drivers movable in the jack to force the formed fastenings through the inserting passages into the work.

21. In a heel-attaching machine, a jack having wire-receiving passages in its side wall and fastening-inserting passages in its top, holders for coils of wire, feeding mechanism for uncoiling the wires from the holders and introducing it into the receiving passages, cutters reciprocating across the paths of advance of the wires, fastening-formers acting upon the wires within the jack, and drivers movable in the jack to force the formed fastenings through the inserting passages into the work.

22. In a fastening-inserting machine, a jack arranged to support the heel-seat-portion of a shoe, two formers spaced from each other within the jack and movable to operate upon each fastening, and a fastening-driver movable in the jack between the pair of formers.

23. In a fastening-inserting machine, a jack arranged to support the heel-seat-portion of a shoe, two formers spaced from each other within the jack and movable to operate upon each fastening, and an anvil movable in the jack into and out of the space between the formers and cooperating therewith in the bending of the fastenings.

24. In a heel-attaching machine, a jack, upper and lower plates movable therein independently of each other during the operation of the machine, means for moving the plates, and fastening-engaging members carried by the plates.

25. In a heel-attaching machine, a jack, upper and lower plates movable therein, means for moving the plates, rods rising from the plates, and former- and driver-bars carried by the rods.

26. In a heel-attaching machine, a jack, upper and lower plates movable therein, means for moving the plates, rods rising from the lower plate and passing through the upper, former-bars carried by the rods, rods rising from the upper plate, and driver-bars carried by the last-mentioned rods.

27. In a heel-attaching machine, a jack, upper and lower plates movable therein, means for moving the plates, rods rising from the lower plate and passing through the upper, former-bars carried by the rods, anvils movable laterally of the jack between pairs of former-bars, rods rising from the upper plate, and driver-bars carried by the last-mentioned rods.

28. In a fastening-inserting machine, a work-support, a former-assembly and a driver-assembly movable upon the support, a reciprocatory actuating member, and means for communicating the movement of the actuating member successively to the former-assembly and to the driver-assembly.

29. In a fastening-inserting machine, a work-support, a former-assembly and a driver-assembly movable upon the support, a reciprocatory actuating member, and members movable with and upon the actuating member for communicating its movement successively to the former-assembly and to the driver-assembly.

30. In a fastening-inserting machine, a work-support, a former-assembly and a driver-assembly movable upon the support, a reciprocatory actuating member, and a connecting member movable upon the actuating member for engagement with the former-assembly to move it in opposite directions and for engagement with the driver-assembly to move it in one direction.

31. In a fastening-inserting machine, a work-support, a former-assembly and a driver-assembly movable upon the support, a reciprocatory actuating member, and a connecting member movable upon the actuating member for engagement with the former-assembly to move it in opposite directions and for engagement with the driver-assembly to move it in one direction, the former-assembly communicating its movement to said driver-assembly in the opposite direction.

32. In a fastening-inserting machine, a work-support, a former-assembly and a driver-assembly movable in the support, a plunger reciprocating in the support, and a connecting member movable upon the plunger and acting successively upon the former-assembly and the driver-assembly.

33. In a fastening-inserting machine, a work-support, a former-assembly and a driver-assembly movable in the support, a plunger reciprocating in the support, a connecting member movable upon the plunger and acting successively upon the former-assembly and the driver-assembly, and means made effective by the movement of the former-assembly for moving the connecting member upon the plunger.

34. In a fastening-inserting machine, a work-support, a former-assembly and a driver-assembly movable in the support, a plunger reciprocating in the support, a plurality of connecting members movable upon the plunger and cooperating with the assemblies, and a member movable upon the plunger in engagement with all the connecting members to cause their movement.

35. In a fastening-inserting machine, a work-support, a former-assembly and a driver-assembly movable in the support, a plunger reciprocating in the support, a connecting member movable upon the plunger and acting successively upon the former-assembly and the driver-assembly, two slides movable upon the plunger, one slide engaging the second slide and said second slide engaging the connecting member, and means for moving the first of the slides.

36. In a fastening-inserting machine, a work-support, a former-assembly and a driver-assembly movable in the support, a plunger reciprocating in the support, a connecting member movable upon the plunger and acting successively upon the former-assembly and the driver-assembly, two slides movable upon the plunger, one slide engaging the second slide and said second slide engaging the connecting member, and a lever fulcrumed upon the support and movable by one of the assemblies into engagement with the first of these slides.

37. In a heel-attaching machine, a jack, a plate movable in the jack and provided with operating bars, a plunger reciprocating in the jack, and a connecting slide movable transversely of the upper end of the plunger and having an upward projection for contact with the plate.

38. In a heel-attaching machine, a jack, a plate movable in the jack and provided with operating bars, a plunger reciprocating in the jack, and a connecting slide movable transversely of the upper end of the plunger and having an upward projection in which is a depression to receive the edge of the plate.

39. In a heel-attaching machine, a jack, a plate movable in the jack and provided with operating bars, a plunger reciprocating in the jack, a connecting slide movable transversely of the upper end of the plunger and having an upward projection in which is a depression to receive the edge of the plate, and two actuating slides for the connecting slide, said actuating slides being respectively movable longitudinally and transversely of the plunger.

40. In a heel-attaching machine, a jack, a plate movable in the jack and provided with operating bars, a plunger reciprocating in the jack, a connecting slide movable transversely of the upper end of the plunger and having an upward projection in which is a depression to receive the edge of the plate, two actuating slides for the connecting slide, said actuating slides being respectively movable longitudinally and transversely of the plunger, and a lever fulcrumed upon the jack and movable by engagement of the plate to move the transverse actuating slide.

41. In a fastening-inserting machine, a work-support, pairs of fastening-formers movable therein, an anvil movable in the support for co-operation with a plurality of pairs of formers, and drivers for the formed fastenings movable in the support.

42. In a fastening-inserting machine, a work-support, a pair of spaced fastening-formers movable therein, an anvil movable into and out of the space between the formers, a fastening-driver movable into the space between the formers left vacant by the anvil, and means movable prior to movement of the driver for withdrawing the anvil from between the formers.

43. In a fastening-inserting machine, a work-support, a plurality of formers movable therein, a plurality of movable anvils co-operating with the formers, a member engaging plural anvils to move them, and a plurality of drivers for the formed fastenings.

44. In a fastening-inserting machine, a work-support, a fastening-former and a fastening-driver movable therein, an anvil movable in the support for co-operation with the former, and a member movable independently of the driver and acting upon the anvil to carry it into and out of the operating position.

45. In a fastening-inserting machine, a work-support, a plurality of formers movable therein, a plurality of movable anvils co-operating with the formers, a member engaging plural anvils to move them, means for moving the member in opposite directions in engagement with the anvils, and a plurality of drivers for the formed fastenings.

46. In a heel-attaching machine, a jack having side and rear staple-driving passages, staple-formers movable at opposite sides of the passages, opposite anvils movable in co-operation with the side-formers from front to rear of the jack, an anvil movable in co-operation with the rear formers transversely of the jack, and drivers for the formed staples.

47. In a heel-attaching machine, a jack, a pair of fastening-formers reciprocating in the jack, an anvil movable between the pair of formers, means movable with the formers for moving the anvil, and drivers for the formed fastening.

48. In a heel-attaching machine, a jack, a pair of fastening-formers reciprocating in the jack, an anvil movable between the pair of formers, a lever fulcrumed upon the jack for engagement with the anvil, means for oscillating the lever, and means for driving the formed fastening.

49. In a heel-attaching machine, a jack, a pair of fastening-formers reciprocating in the jack, an anvil movable between the pair of formers, a lever fulcrumed upon the jack for engagement with the anvil, means movable with the formers for oscillating the lever, and means for driving the formed fastening.

50. In a heel-attaching machine, a jack, a pair of fastening-formers reciprocating in the jack, an anvil movable between the pair of formers, a lever fulcrumed upon the jack for engagement with the anvil, a cam movable with the formers for moving the anvil, and means for driving the formed fastenings.

51. The combination with a work-support, of mechanism at the support for operating upon a fastening, a carrier movable toward and from the support, and a holder for a coil of fastening-material and feeding mechanism for the material mounted upon the carrier, the feeding mechanism delivering the material to the support.

52. The combination with a work-support, of mechanism at the support for operating upon a fastening, a carrier movable toward and from the support, and a holder for a coil of fastening-material, feeding mechanism for the material and cutting mechanism for the material all mounted upon the carrier, the cut material being delivered to the support.

53. The combination with a work-support, of mechanism in the support for operating upon a fastening, a carrier movable toward and from the support, and a holder for a coil of fastening-material, feeding mechanism for the material and cutting mechanism for the material all mounted upon the carrier, the feeding mechanism acting to advance into the support the pieces of material which have been cut from the coil.

54. The combination with a work-support, of mechanism at the support for operating upon a fastening, a carrier movable toward and from the support, means for holding a plurality of coils of fastening-material upon the carrier, and feeding means upon the carrier acting upon the material of plural coils to deliver said material to the support.

55. In a heel-attaching machine, a jack, fastening-forming and -driving mechanism operating therein, and a plurality of feeding mechanisms arranged about the jack and adapted to deliver fastening-material thereto for forming.

56. In a heel-attaching machine, a jack, fastening-forming and -driving mechanism operating therein, and a plurality of feeding mechanisms arranged about the jack, certain of said mechanisms being adapted to deliver thereto plural strands of fastening-material and another mechanism being adapted to deliver a single strand of such material.

57. In a heel-attaching machine, a jack, means movable in the jack for operating upon fastening-material, a carrier-slide movable toward and from the jack, means mounted upon the slide for feeding fastening-material to the jack, and a movable member having means for moving the slide and for actuating the feeding means.

58. In a heel-attaching machine, a jack, means movable in the jack for operating upon fastening-material, a carrier-slide movable toward and from the jack, means mounted upon the slide for feeding fastening-material to the jack, and an oscillatory segment provided with cams acting upon the slide and the feeding means.

59. In a heel-attaching machine, a jack, means movable in the jack for operating upon fastening-material, a carrier-slide movable toward and from the jack, means mounted upon the slide for feeding fastening-material to the jack, a movable member having means for moving the slide and for actuating the feeding means, fastening-cutting mechanism mounted upon the slide, and a member fixed against movement in the direction of advance of the slide for actuating the cutting mechanism.

60. In a heel-attaching machine, a jack, means movable in the jack for operating upon fastening-material, a carrier-slide movable toward and from the jack, means mounted upon the slide for feeding fastening-material to the jack, a movable member having means for moving the slide and for actuating the feeding means, fastening-cutting mechanism mounted upon the slide, and a contact member fixed against movement in the direction of advance of the slide for actuating the cutting mechanism, the contact member being arranged to yield upon the retraction of the slide.

61. In a heel-attaching machine, a jack, a plunger movable therein, fastening-feeding mechanism delivering to the jack, an actuating member for the feeding mechanism movable adjacent to the jack, a lever connected to the plunger, a shaft geared to the actuating member, a driving shaft, and cam mechanism upon the driving shaft for oscillating the lever and the shaft of the actuating member.

62. In a heel-attaching machine, a jack, a plunger movable therein, fastening-feeding mechanism delivering to the jack, an actuating member for the feeding mechanism movable adjacent to the jack, a shaft geared to the actuating member, a driving shaft, a cam-disk secured to the driving shaft, a toggle-lever pivoted at one end to the plunger and at the other upon the shaft, a lever joined to the center of the toggle and oscillated by the cam-disk, and a lever geared to the shaft of the actuating member and oscillated by the cam-disk.

63. In a heel-attaching machine, a jack, means for delivering fastening-material to the jack, and means for removing a heeled shoe from the jack and out of the path of the fastening-material from the delivering means.

64. In a heel-attaching machine, a jack having passages for the reception of fastening-material, means operating successively in a single cycle of the machine for forming the fastenings from the material, driving said fastenings into the jacked work and delivering fastening-material to the jack to be formed, and means for removing a heeled shoe from the jack between the fastening-driving and material-delivering portions of the cycle.

65. In a heel-attaching machine, a jack, a pressure-head co-operating therewith, members movable upon the head to grasp a heel upon the heel-seat of a jacked shoe, and a latch for retaining the members in their heel-grasping relation, said latch being movable by the operator to release the heel.

66. In a heel-attaching machine, a jack, a pressure-head co-operating therewith, opposite heel-grasping members pivoted upon the head, inner and outer members movable in the head, the outer member engaging the grasping members to move them, a tread-abutment carried by the inner member, and means for communicating the movement of the inner member to the outer upon contact of the tread-abutment with a heel.

67. In a heel-attaching machine, a jack, a pressure-head co-operating therewith, opposite heel-grasping members pivoted upon the head, inner and outer members movable in the head, the outer member engaging the grasping members to move them, a tread-abutment carried by the inner member, and a spring interposed between the inner and outer members to communicate movement of one to the other.

68. In a heel-attaching machine, a jack, a pressure-head co-operating therewith, opposite heel-grasping members pivoted upon the head, inner and outer actuating members movable in the head, the outer member engaging the grasping members to move them, a tread-abutment carried by the inner member, means for communicating movement of one actuating member to the other, and a latch for engagement with the inner member.

69. In a heel-attaching machine, a jack, a pressure-head co-operating therewith, opposite heel-grasping levers fulcrumed upon the head, a sleeve movable in the head and having opposite openings to receive the ends of the levers, a plunger movable in the sleeve and carrying a tread-abutment, and means for communicating movement of the plunger to the sleeve.

70. In a heel-attaching machine, a jack, a pressure-head co-operating therewith, opposite heel-grasping levers fulcrumed upon the head, a sleeve movable in the head, said sleeve being provided in its side with a slot and having opposite openings to receive the ends of the levers, a plunger movable in the sleeve and carrying a tread-abutment, springs interposed between the sleeve and head and between the plunger and sleeve, and a latch extending through the slot in the sleeve for engagement with the plunger.

71. In a heel-attaching machine, a jack, a pressure-head co-operating therewith and including a support, opposite members movable upon the support to grasp a heel upon a jacked shoe, a tread-abutment movable upon the support, and means for communicating the movement of the abutment to the grasping members, the abutment being seated against the support as it completes the heel-grasping movement of the members.

72. In a heel-attaching machine, a jack, a pressure-head co-operating therewith and including a casing, opposite members movable upon the casing to grasp a heel upon a jacked shoe, two actuating members movable in the casing, one of said members carrying a tread-abutment and the other being engaged by the grasping members, and yieldable means for communicating the movement of the tread-abutment member to the other actuating member and thus to the grasping members.

JOHN T. LANCASTER.